United States Patent
Mukherjee et al.

(10) Patent No.: US 12,379,972 B2
(45) Date of Patent: Aug. 5, 2025

(54) MANAGING COMPUTING WORKLOADS WITHIN A COMPUTING ENVIRONMENT

(71) Applicant: Dell Products L.P., Round Rock, TX (US)

(72) Inventors: Rishi Mukherjee, Bangalore (IN); Ravishankar N. Kanakapura, Bangalore (IN); Prasoon Kumar Sinha, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 499 days.

(21) Appl. No.: 18/046,050

(22) Filed: Oct. 12, 2022

(65) Prior Publication Data

US 2024/0126619 A1     Apr. 18, 2024

(51) Int. Cl.
    *G06F 9/46*     (2006.01)
    *G06F 9/50*     (2006.01)

(52) U.S. Cl.
    CPC .......... *G06F 9/5094* (2013.01); *G06F 9/5072* (2013.01); *G06F 9/5088* (2013.01); *G06F 2209/5022* (2013.01); *G06F 2209/503* (2013.01); *G06F 2209/505* (2013.01)

(58) Field of Classification Search
None
See application file for complete search history.

(56) References Cited

U.S. PATENT DOCUMENTS

| | | | |
|---|---|---|---|
| 11,240,128 B2 * | 2/2022 | Chitalia | G06F 11/3452 |
| 11,579,943 B2 * | 2/2023 | Reineke | G06F 1/30 |
| 2023/0195373 A1 * | 6/2023 | Pabón | G06F 3/0604 |
| | | | 711/154 |

* cited by examiner

*Primary Examiner* — Bing Zhao
(74) *Attorney, Agent, or Firm* — McDermott Will & Emery LLP

(57) ABSTRACT

Managing computing workloads within a computing environment including identifying computing parameters of datacenter elements of each computing cluster of a computing environment; for each computing cluster of the computing environment: determining a health of the power device of the computing cluster; for each computing node of the computing cluster: determining a processing load of the computing node; determining a computing cost associated with a geo-location of the computing node; calculating, for each computing cluster, an availability of computing resources of the computing cluster based on the computing parameters of the data center elements of the computing cluster, the health of the power device of the computing cluster, the processing load of each computing node of the computing cluster, and the computing cost of each computing node of the computing cluster; generating a ranking of each computing cluster based on the availability of the computing resources of the computing cluster.

17 Claims, 3 Drawing Sheets

MANAGING COMPUTING WORKLOADS WITHIN A COMPUTING ENVIRONMENT

BACKGROUND

Field of the Disclosure

The disclosure relates generally to managing computing workloads within a computing environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data center applications require reliable power sources. Today's world is seeing an increase in the use of cloud computing and being connected to the Internet at all times. The data center is the core of the Internet, and to provide maximum availability, the data centers are designed for maximum reliability.

SUMMARY

Innovative aspects of the subject matter described in this specification may be embodied in a method of managing computing workloads within a computing environment, including identifying computing parameters of a plurality of datacenter elements of each computing cluster of a computing environment, the data center elements including one or more of computing nodes, storage devices, network devices, and power devices; for each computing cluster of the computing environment: determining a health of the power device of the computing cluster based on telemetry data of the power device; for each computing node of the computing cluster: determining a computational processing load of the computing node; determining a computing cost associated with a geo-location of the computing node; calculating, for each computing cluster of the computing environment, an availability of computing resources of the computing cluster based on the computing parameters of the data center elements of the computing cluster, the health of the power device of the computing cluster, the computational processing load of each computing node of the computing cluster, and the computing cost of each computing node of the computing cluster; and generating a ranking of each computing cluster based on the availability of the computing resources of the computing cluster Other embodiments of these aspects include corresponding systems, apparatus, and computer programs, configured to perform the actions of the methods, encoded on computer storage devices.

These and other embodiments may each optionally include one or more of the following features. For instance, detecting a disruption of execution of a computing workload at a first computing cluster of the computing environment; in response to detecting the disruption of execution of the computing workload at the first computing cluster: identifying a second computing cluster of the computing environment based on the ranking; and migrating the computing workload from the first computing cluster to the second computing cluster. Detecting the disruption of execution of the computing workload includes identifying an emergency power reduction at the first computing cluster. Identifying the computing parameters of the plurality of datacenter elements of each computing cluster further includes identifying a generation and a model of each datacenter element, and identifying a classification of each component of each datacenter element. The ranking is a static ranking. The ranking is a dynamic ranking. Determining the computational processing load of the computing node further comprises monitoring telemetry data of the computing node, the telemetry data including power utilized by the computing node, power utilized by each component of the computing node, compute utilization per second (CUPS) of the computing node, and health of each component of the computing node; and determining the computing processing load of the computing node based on the monitored telemetry data.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
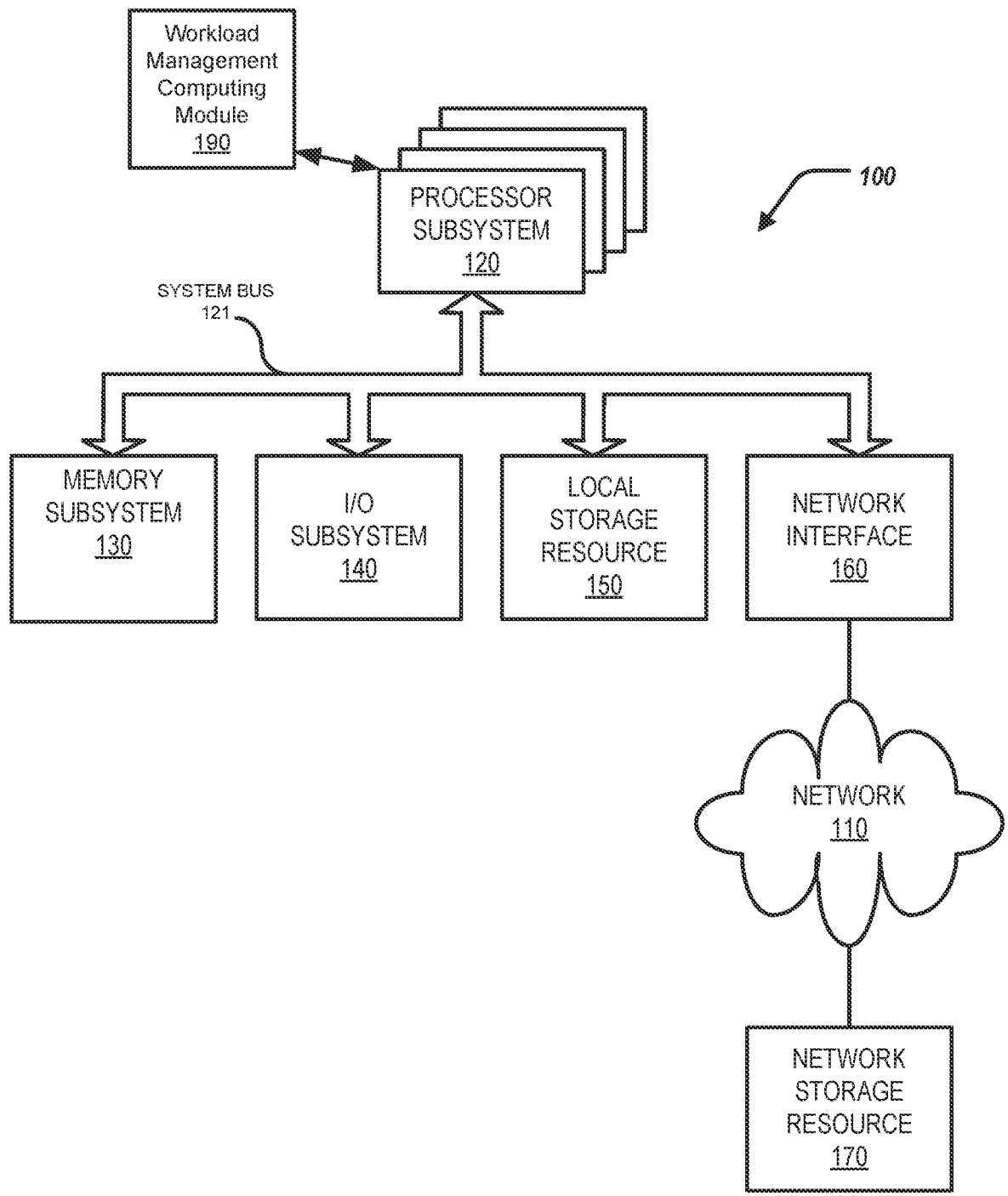
FIG. 1 is a block diagram of selected elements of an embodiment of an information handling system.

This disclosure discusses methods and systems for managing computing workloads withing a computing environment. In short, intuitive scheduling and/or migration of workloads between computing clusters of a computing environment can be based on at least grid power, cluster health, and categorization of the cluster. High-priority workloads can be migrated between computing clusters that best fit the workload when a situation arises which leads to disruption of high availability of services.

Specifically, this disclosure discusses a system and a method for managing computing workloads within a computing environment, including identifying computing parameters of a plurality of datacenter elements of each computing cluster of a computing environment, the data center elements including one or more of computing nodes, storage devices, network devices, and power devices; for each computing cluster of the computing environment: determining a health of the power device of the computing cluster based on telemetry data of the power device; for each computing node of the computing cluster: determining a computational processing load of the computing node; determining a computing cost associated with a geo-location of the computing node; calculating, for each computing cluster of the computing environment, an availability of computing resources of the computing cluster based on the computing parameters of the data center elements of the computing cluster, the health of the power device of the computing cluster, the computational processing load of each computing node of the computing cluster, and the computing cost of each computing node of the computing cluster; and generating a ranking of each computing cluster based on the availability of the computing resources of the computing cluster.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Figure 2:
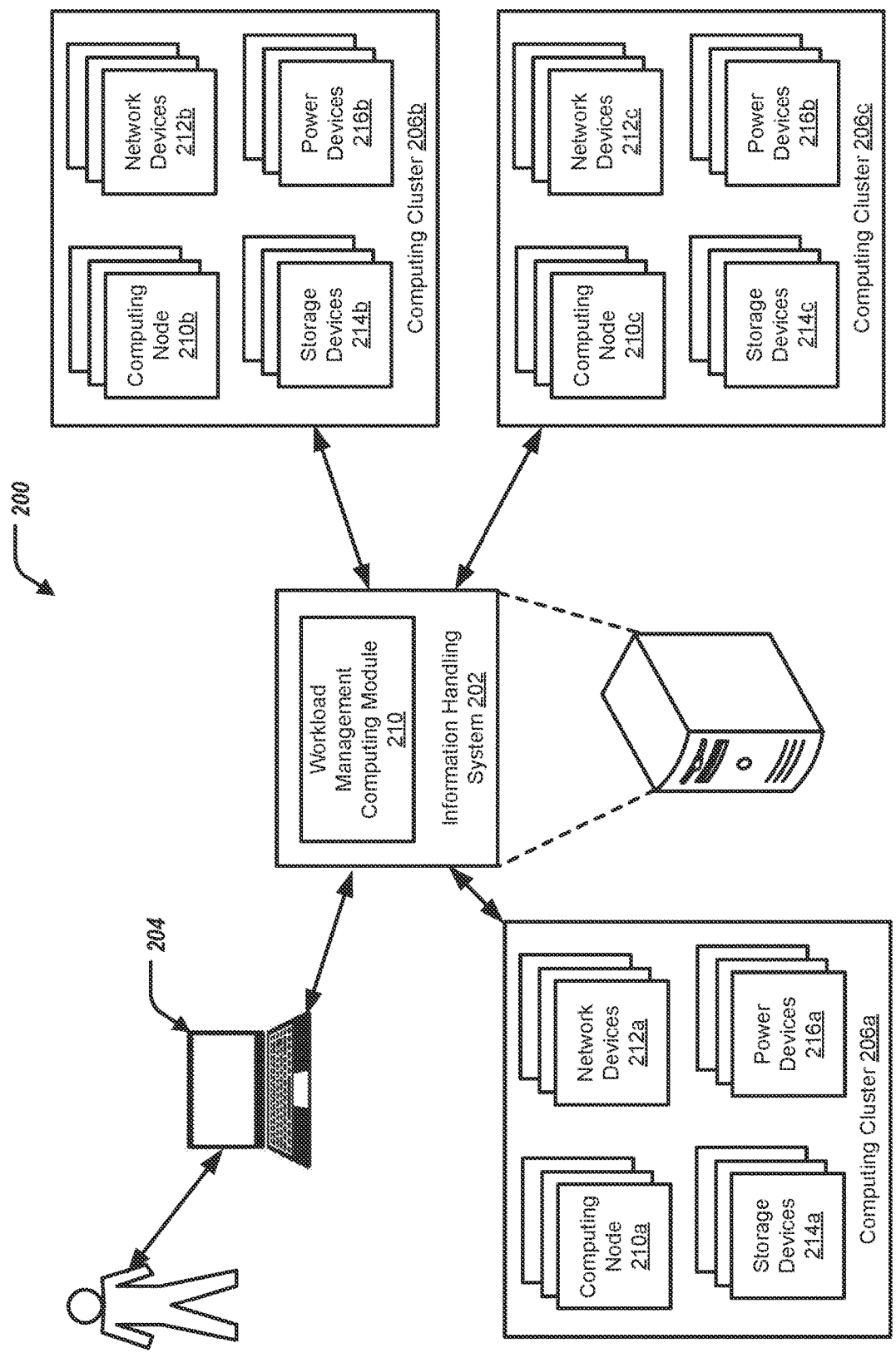
FIG. 2 illustrates a block diagram of a computing environment for managing computing workloads.
Figure 3:
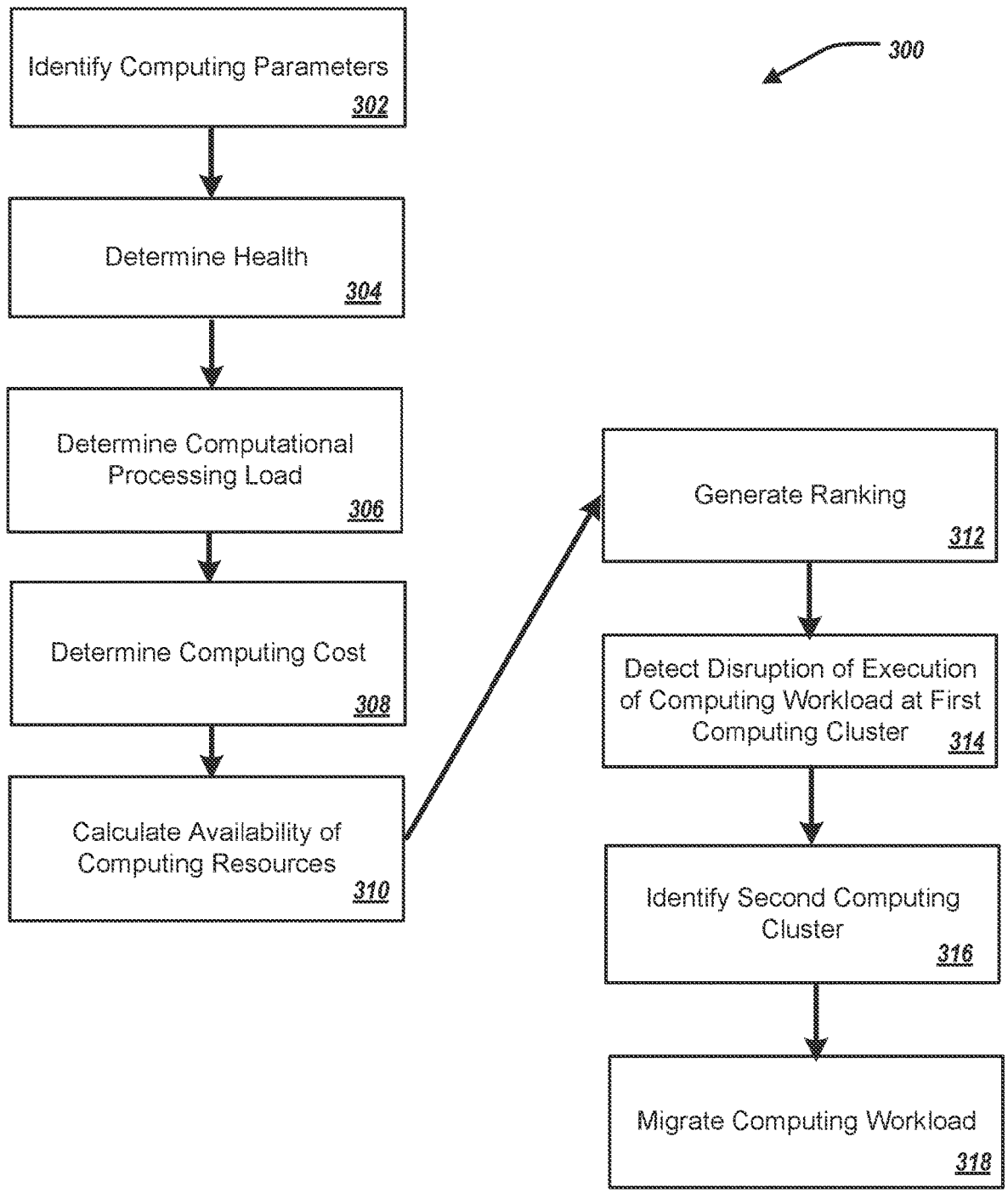
FIG. 3 illustrates a method for managing computing workloads within a computing environment.

Particular embodiments are best understood by reference to FIGS. 1-3 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include a workload management computing module 190. The workload management computing module 190 can be included by the processor subsystem 120, or in communication with the processor subsystem 120.

In short, the workload management computing module 190 can facilitate intuitively scheduling and/or migration of workloads between computing clusters of a computing environment based on at least grid power, cluster health, and categorization of the cluster. High-priority workloads can be migrated between computing clusters that best fit the workload when a situation arises which leads to disruption of high availability of services.

Turning to FIG. 2, FIG. 2 illustrates a computing environment 200 including an information handling system 202, a client information handling system 204, and computing clusters 206a, 206b, 206c (collectively referred to as computing clusters 206). The information handling system 202 can include a workload management computing module 209. In some examples, the information handling system 202 is similar to, or includes, the information handling system 100 of FIG. 1. In some examples, the workload management computing module 209 is the same, or substantially the same, as the workload management computing module 190 of FIG. 1.

The computing cluster 206a can include one or more computing nodes 210a, one or more network devices 212a, one or more storage devices 214a, and one or more power devices 216a. The computing cluster 206b can include one or more computing nodes 210b, one or more network devices 212b, one or more storage devices 214b, and one or more power devices 216b. The computing cluster 206c can include one or more computing nodes 210c, one or more network devices 212c, one or more storage devices 214c, and one or more power devices 216c. The computing nodes 210a, 210b, 210c are collectively referred to as computing nodes 210. The network devices 212a, 212b, 212c are collectively referred to as network devices 212. The storage devices 214a, 214b, 214c are collectively referred to as storage devices 214. The power devices 216a, 216b, 216c are collectively referred to as power devices 216.

In some examples, the power devices 216 can include a power distribution unit (PDU). In some examples, the power devices 216 can include an uninterruptible power supply (UPS).

Each of the computing nodes 210 can include one or more computing components that perform one or more computing functions at the respective computing node 210.

The information handling system 202 can be in communication with the client information handling system 204, and the computing clusters 206. The client information handling system 204 can be in communication with the information handling system 202. The computing clusters 206 can be in communication with the information handling system 202.

To that end, the workload management computing module 209 can manage computing workloads within the computing environment 200.

The workload management computing module 209 can identify computing parameters of the computing nodes 210, the network devices 212, the storage devices 214, and the power devices 216 ("datacenter elements") of each of the computing clusters 206 of the computing environment 200. In some examples, the workload management computing module 209 identifies the computing parameters of the datacenter elements of each computing cluster 206 by identifying a generation and a model of each datacenter element, and identifying a classification of each component of each datacenter element.

The workload management computing module 209, for each computing cluster 206 of the computing environment 200, determines a health of the power device 216 of the computing cluster 206 based on telemetry data of the power device 216. The workload management computing module 209 can monitor the telemetry data of the power devices 216. For example, the workload management computing module 209 can monitor the status of the power devices 216, including monitoring if failure of the power devices 216 has occurred. For example, the workload management computing module 209 can monitor an operating condition of fans of the power devices 216, including whether the fans are functioning properly and/or the fans are powered on. For example, the workload management computing module 209 can monitor a working condition of capacitors of the power devices 216, including whether the capacitor are working and providing utility. For example, the workload management computing module 209 can monitor whether the power devices 216 are suffering from a power outage that is longer than an available power available by the power devices 216. For example, the workload management computing module 209 can monitor an age of the power devices 216. For example, the workload management computing module 209 can monitor a positioning of the power devices 216, including a placement of the power devices 216 within a bypass. For example, the workload management computing module 209 can monitor an overloading or underloading of the power devices 216. For example, the workload management computing module 209 can monitor an overuse of the power devices.

The workload management computing module 209, for each computing node 210 of each computing cluster 206 of the computing environment 200, determines a computational processing load of the computing node 210. In other words, the workload management computing module 209, for each computing node 210 of each computing cluster 206 of the computing environment 200, monitors telemetry data of the computing nodes 210 to determine resource utilization at the respective computing clusters 206. For example, the telemetry data can include a power utilized by the computing node 210, a power utilized by each component of the computing node 210, a compute utilization per second (CUPS) of the computing node 210, and a health of each component of the computing node 210. The workload management computing module 209, for each computing node 210 of each computing cluster 206 of the computing environment 200, determines the computational processing load of the computing node 210 based on the monitored telemetry data.

The workload management computing module 209, for each computing node 210 of each computing cluster 206 of the computing environment 200, determines a computing cost associated with a geo-location of the computing node 210. In other words, the workload management computing module 209, for each computing node 210 of each computing cluster 206 of the computing environment 200, determines a "grid cost" to operate the computing node 210. That is, the workload management computing module 209, for each computing node 210 of each computing cluster 206 of the computing environment 200, can determine a cost (e.g., financial) of operating the computing node 206 (and the computing cluster 206) for a particular geo-location (physical location) of the computing node 210. For example, differing geo-locations of the varying computing nodes 210 can provide differing costs (e.g., financial) for performing computational tasks at the respective computing node 210.

The workload management computing module 209, for each computing cluster 206 of the computing environment 200, calculates an availability of computing resources of the computing cluster 206. Specifically, the workload management computing module 209, for each computing cluster 206 of the computing environment 200, calculates an availability of computing resources of the computing cluster 206 based on one or more of i) the computing parameters of the data center elements (the computing nodes 210, the network devices 212, the storage devices 214, and the power devices 216) of the computing cluster 206, the health of the power device 216 of the computing cluster 206, the computational processing load of each computing node 210 of the computing cluster 206, and the computing cost of each computing node 210 of the computing cluster 206.

The workload management computing module 209 generates a ranking of each computing cluster 206 based on the availability of the computing resources of the computing cluster 206. That is, the workload management computing module 209, for each computing cluster 206 of the computing environment 200, quantifies an availability of computing resources of the computing cluster 206. To that end, based on the quantified availability of computing resources of the computing cluster 206, the workload management computing module 209 generates a ranking of each computing cluster 206. In some examples, the ranking of each computing cluster 206 is a static ranking. That is, the workload management computing module 209 generates a ranking of each computing cluster 206 based on the availability of the computing resources of the computing cluster 206 at a single time. In some examples, the ranking of each computing cluster 206 is a dynamic ranking. That is, the workload management computing module 209 generates a ranking of each computing cluster 206 based on the availability of the computing resources of the computing cluster 206 at multiple times.

The workload management computing module 209 detects a disruption of execution of a computing workload at a first computing cluster 206 of the computing environment 200. For example, the computing cluster 206a can (initially) execute a computing workload. The workload management computing module 209 can detect a disruption of execution of the computing workload at the computing cluster 206a. In some examples, the computing cluster 206a communicates to the workload management computing module 209 an indication of such disruption.

In some examples, the workload management computing module 209 detects a disruption of execution of the computing workload at the first computing cluster 206 (e.g., the computing cluster 206a) of the computing environment 200 by identifying an emergency power reduction at the first computing cluster 206 (e.g., the computing cluster 206a). For example, such emergency power reduction at the computing cluster 206a can arise due to health of the computing cluster 206a, brownout situations, or blackout situations.

The workload management computing module 209, in response to detecting the disruption of execution of the computing workload at the first computing cluster (e.g., the computing cluster 206a), identifies a second computing cluster 206 of the computing environment 200 based on the ranking. That is, the workload management computing module 209 access the ranking of each computing cluster 206 (that is based on the availability of the computing resources of the computing cluster 206), and based on such ranking, identify the highest ranking computing cluster 206. For example, the workload management computing module 209 can identify the computing cluster 206b as the highest ranking computing cluster 206 of the ranking.

The workload management computing module 209, further in response to detecting the disruption of execution of the computing workload at the first computing cluster (e.g., the computing cluster 206a), migrates the computing workload from the first computing cluster (e.g., the computing cluster 206a) to the second computing cluster (e.g., the computing cluster 206b). That is, the workload management computing module 209 migrates the computing workload from the computing cluster 206a to the computing cluster 206b for an uninterrupted execution of the computing workload. In some examples, the workload management computing module 209 migrates an entirety of the computing workload from the computing cluster 206a to the computing cluster 206b. In some examples, the workload management computing module 209 migrates an unexecuted portion of the computing workload from the computing cluster 206a to the computing cluster 206b.

FIG. 3 illustrates a flowchart depicting selected elements of an embodiment of a method 300 for managing computing workloads withing the computing environment 200. The method 300 may be performed by the information handling system 100, the information handling system 202, and/or the computing clusters 206, and with reference to FIGS. 1-2. It is noted that certain operations described in method 300 may be optional or may be rearranged in different embodiments.

The workload management computing module 209 identifies computing parameters of a plurality of datacenter elements (the computing nodes 210, the network devices 212, the storage devices 214, and the power devices 216) of each computing cluster 206 of the computing environment 200, at 302. The workload management computing module 209, for each computing cluster 206 of the computing environment 200, determines a health of the power device 216 of the computing cluster 206 based on telemetry data of the power device 216, at 304. The workload management computing module 209, for each computing node 210 of each computing cluster 206, determines a computational processing load of the computing node 210, at 306. The workload management computing module 209, for each computing node 210 of each computing cluster 206, determines a computing cost associated with a geo-location of the computing node 210, at 308. The workload management computing module 209 calculates, for each computing cluster 206 of the computing environment 200, an availability of computing resources of the computing cluster 206 based on the computing parameters of the data center elements of the computing cluster 206, the health of the power device 216 of the computing cluster 206, the computational processing load of each computing node 210 of the computing cluster 206, and the computing cost of each computing node 210 of the computing cluster 206, at 310. The workload management computing module 209 generates a ranking of each computing cluster 206 based on the availability of the computing resources of the computing clusters 206, at 312. The workload management computing module 209 detects a disruption of execution of a computing workload at computing cluster 206a of the computing environment 200, at 314. The workload management computing module 209, in response to detecting the disruption of execution of the computing workload at first computing cluster 206a, identifies computing cluster 206b of the computing environment 200 based on the ranking, at 316. The workload management computing module 209, in response to detecting the disruption of execution of the computing workload at computing cluster 206a, migrates the computing workload from the computing cluster 206a to computing cluster 206b, at 318.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing computing workloads within a computing environment, the method comprising:
identifying computing parameters of a plurality of datacenter elements of each computing cluster of a computing environment, the data center elements including one or more of computing nodes, storage devices, network devices, and power devices;
for each computing cluster of the computing environment:
  determining a health of the power device of the computing cluster based on telemetry data of the power device;
  for each computing node of the computing cluster:
    determining a computational processing load of the computing node;
    determining a computing cost associated with a geo-location of the computing node;
calculating, for each computing cluster of the computing environment, an availability of computing resources of the computing cluster based on the computing parameters of the data center elements of the computing cluster, the health of the power device of the computing cluster, the computational processing load of each computing node of the computing cluster, and the computing cost of each computing node of the computing cluster;

generating a ranking of each computing cluster based on the availability of the computing resources of the computing cluster;

detecting a disruption of execution of a computing workload at a first computing cluster of the computing environment;

in response to detecting the disruption of execution of the computing workload at the first computing cluster:

identifying a second computing cluster of the computing environment based on the ranking; and migrating the computing workload from the first computing cluster to the second computing cluster.

2. The computer-implemented method of claim 1, wherein detecting the disruption of execution of the computing workload includes identifying an emergency power reduction at the first computing cluster.

3. The computer-implemented method of claim 1, wherein identifying the computing parameters of the plurality of datacenter elements of each computing cluster further includes identifying a generation and a model of each datacenter element, and identifying a classification of each component of each datacenter element.

4. The computer-implemented method of claim 1, wherein the ranking is a static ranking.

5. The computer-implemented method of claim 1, wherein the ranking is a dynamic ranking.

6. The computer-implemented method of claim 1, wherein determining the computational processing load of the computing node further comprises:

monitoring telemetry data of the computing node, the telemetry data including power utilized by the computing node, power utilized by each component of the computing node, compute utilization per second (CUPS) of the computing node, and health of each component of the computing node; and determining the computing processing load of the computing node based on the monitored telemetry data.

7. An information handling system comprising a processor having access to memory media storing instructions executable by the processor to perform operations, comprising:

identifying computing parameters of a plurality of datacenter elements of each computing cluster of a computing environment, the data center elements including one or more of computing nodes, storage devices, network devices, and power devices;

for each computing cluster of the computing environment:
determining a health of the power device of the computing cluster based on telemetry data of the power device;
for each computing node of the computing cluster:
determining a computational processing load of the computing node;
determining a computing cost associated with a geo-location of the computing node;

calculating, for each computing cluster of the computing environment, an availability of computing resources of the computing cluster based on the computing parameters of the data center elements of the computing cluster, the health of the power device of the computing cluster, the computational processing load of each computing node of the computing cluster, and the computing cost of each computing node of the computing cluster;

generating a ranking of each computing cluster based on the availability of the computing resources of the computing cluster;

detecting a disruption of execution of a computing workload at a first computing cluster of the computing environment;

in response to detecting the disruption of execution of the computing workload at the first computing cluster:

identifying a second computing cluster of the computing environment based on the ranking; and migrating the computing workload from the first computing cluster to the second computing cluster.

8. The information handling system of claim 7, wherein detecting the disruption of execution of the computing workload includes identifying an emergency power reduction at the first computing cluster.

9. The information handling system of claim 7, wherein identifying the computing parameters of the plurality of datacenter elements of each computing cluster further includes identifying a generation and a model of each datacenter element, and identifying a classification of each component of each datacenter element.

10. The information handling system of claim 7, wherein the ranking is a static ranking.

11. The information handling system of claim 7, wherein the ranking is a dynamic ranking.

12. The information handling system of claim 7, wherein determining the computational processing load of the computing node further comprises:

monitoring telemetry data of the computing node, the telemetry data including power utilized by the computing node, power utilized by each component of the computing node, compute utilization per second (CUPS) of the computing node, and health of each component of the computing node; and determining the computing processing load of the computing node based on the monitored telemetry data.

13. A non-transitory computer-readable medium storing software comprising instructions executable by one or more computers which, upon such execution, cause the one or more computers to perform operations comprising:

identifying computing parameters of a plurality of datacenter elements of each computing cluster of a computing environment, the data center elements including one or more of computing nodes, storage devices, network devices, and power devices;

for each computing cluster of the computing environment:
determining a health of the power device of the computing cluster based on telemetry data of the power device;
for each computing node of the computing cluster:
determining a computational processing load of the computing node;
determining a computing cost associated with a geo-location of the computing node;

calculating, for each computing cluster of the computing environment, an availability of computing resources of the computing cluster based on the computing parameters of the data center elements of the computing cluster, the health of the power device of the computing cluster, the computational processing load of each computing node of the computing cluster, and the computing cost of each computing node of the computing cluster;

generating a ranking of each computing cluster based on the availability of the computing resources of the computing cluster;

detecting a disruption of execution of a computing workload at a first computing cluster of the computing environment;

in response to detecting the disruption of execution of the computing workload at the first computing cluster:

identifying a second computing cluster of the computing environment based on the ranking; and migrating the computing workload from the first computing cluster to the second computing cluster.

14. The non-transitory computer-readable medium of claim 13, wherein detecting the disruption of execution of the computing workload includes identifying an emergency power reduction at the first computing cluster.

15. The non-transitory computer-readable medium of claim 13, wherein identifying the computing parameters of the plurality of datacenter elements of each computing cluster further includes identifying a generation and a model of each datacenter element, and identifying a classification of each component of each datacenter element.

16. The non-transitory computer-readable medium of claim 13, wherein the ranking is a static ranking.

17. The non-transitory computer-readable medium of claim 13, wherein the ranking is a dynamic ranking.

* * * * *